(12) United States Patent
Pelotte

(10) Patent No.: US 7,762,005 B2
(45) Date of Patent: Jul. 27, 2010

(54) GAUGES FOR MEASURING THE DEPTH OF DENTS

(75) Inventor: Lawrence John Pelotte, Georgetown, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 69 days.

(21) Appl. No.: 12/145,764

(22) Filed: Jun. 25, 2008

(65) Prior Publication Data

US 2009/0320310 A1 Dec. 31, 2009

(51) Int. Cl.
*G01B 5/18* (2006.01)
(52) U.S. Cl. .............................. 33/836; 33/833; 33/600
(58) Field of Classification Search .................... 33/832, 33/833, 836, 600
See application file for complete search history.

(56) References Cited

U.S. PATENT DOCUMENTS

| | | | |
|---|---|---|---|
| 283,627 A | 8/1883 | Logan | |
| 2,275,036 A | 3/1942 | Schwartz | |
| 2,893,130 A * | 7/1959 | Ierokomos | 33/544 |
| 3,195,237 A | 7/1965 | Aldeborgh | |
| 3,557,460 A * | 1/1971 | McFarland et al. | 33/836 |
| 3,848,339 A | 11/1974 | Strasbaugh | |
| 4,693,012 A | 9/1987 | Cesna | |
| 4,894,920 A * | 1/1990 | Butler et al. | 33/833 |
| 5,205,046 A | 4/1993 | Barnett | |
| 5,235,988 A | 8/1993 | Johnson et al. | |
| 5,471,762 A | 12/1995 | Miller et al. | |
| 6,662,456 B1 * | 12/2003 | Triplett | 33/203 |
| 7,171,760 B1 * | 2/2007 | Lemon | 33/833 |
| 2002/0152628 A1 * | 10/2002 | Buckner et al. | 33/833 |
| 2005/0183281 A1 * | 8/2005 | Kennedy | 33/833 |
| 2006/0090363 A1 * | 5/2006 | Luner et al. | 33/833 |
| 2007/0022620 A1 * | 2/2007 | Batora | 33/836 |

* cited by examiner

*Primary Examiner*—G. Bradley Bennett
(74) *Attorney, Agent, or Firm*—Dinsmore & Shohl LLP

(57) ABSTRACT

Embodiments of a depth gauge comprise a housing, a support structure extending from the bottom of the housing and being configured to balance the depth gauge on uneven or even surfaces, a retractable surface engaging member extending through the bottom of the housing and comprising a lower point configured to detect dents on a surface, and a gauge display coupled to the surface engaging member and operable to output depth measurements of dents detected by the surface engaging member.

20 Claims, 4 Drawing Sheets

GAUGES FOR MEASURING THE DEPTH OF DENTS

TECHNICAL FIELD

Embodiments of the present invention are generally directed to gauges and methods of using the gauges to detect the depth of a dent on a surface, and are specifically directed to gauges operable to detect a dent having a depth of about 0.01 mm or greater.

BACKGROUND

In order to provide a vehicle with excellent styling and aesthetic appeal, it is necessary to provide a painted vehicle surface which is free of dents or nicks. As a result, car manufacturers attempt to pinpoint dents on a surface before painting the vehicle. Based on the size of the dents, the manufacturer decides whether the surface dent is small enough to be covered during painting (e.g., painting using electrocoating or electroplating), or whether the surface needs to be repaired prior to painting. Because there is no effective system or device for measuring the depth of smaller dents (e.g., dents 0.1 mm deep or less), the determination of whether repair is needed essentially constitutes guesswork from the inspectors. Due to this guesswork, there have been instances where the small dents were large enough so that they were not covered during the painting step, a situation not as aesthetically pleasing and/or can lead to quality issues with the paint. Accordingly, there is a need from improved depth gauges operable to detect small dents on a surface, as well as methods of using the depth gauges to eliminate the guesswork in deciding whether to repair a surface prior to painting.

SUMMARY

According to one embodiment, a depth gauge is provided. The depth gauge comprises a housing, a support structure extending from the bottom of the housing and being configured to balance the depth gauge on uneven or even surfaces. The depth gauge further comprises a retractable surface engaging member extending through the bottom of the housing and comprising a lower point configured to detect dents on a surface, and a gauge display coupled to the surface engaging member and operable to output depth measurements of dents detected by the surface engaging member.

According to a further embodiment of a depth gauge, a depth gauge comprises a cylindrical housing, a plurality of legs radially disposed on the bottom of the housing, wherein the plurality of legs are configured to balance the depth gauge on even or uneven surfaces. The depth gauge further comprises a spring loaded retractable surface engaging member coaxially arranged within the cylindrical housing and extending through the bottom of the housing, wherein the spring loaded retractable surface engaging member comprises a lower point configured to detect dents on a surface having a depth of between about 0.01 to about 0.1 mm. Furthermore, the depth gauge comprises a gauge display coupled to the surface engaging member, wherein the gauge display is operable to output depth measurements of dents detected by the surface engaging member.

According to yet another embodiment, a method of analyzing surfaces comprises detecting at least one dent on the surface, measuring the depth of the at least one dent by utilizing a depth gauge, wherein the depth gauge is operable to detect dents having a depth of about 0.01 mm and greater, comparing the measured depth to a predefined threshold value, the predefined threshold value being equal to a maximum acceptable size for a dent, and repairing the dent on the surface when the measured depth is greater than the predefined threshold value.

These and additional features provided by the embodiments of the present invention will be more fully understood in view of the following detailed description, in conjunction with the drawings.

BRIEF DESCRIPTION OF THE DRAWINGS

The following detailed description of specific embodiments of the present invention can be best understood when read in conjunction with the drawings enclosed herewith.

Figure 1:
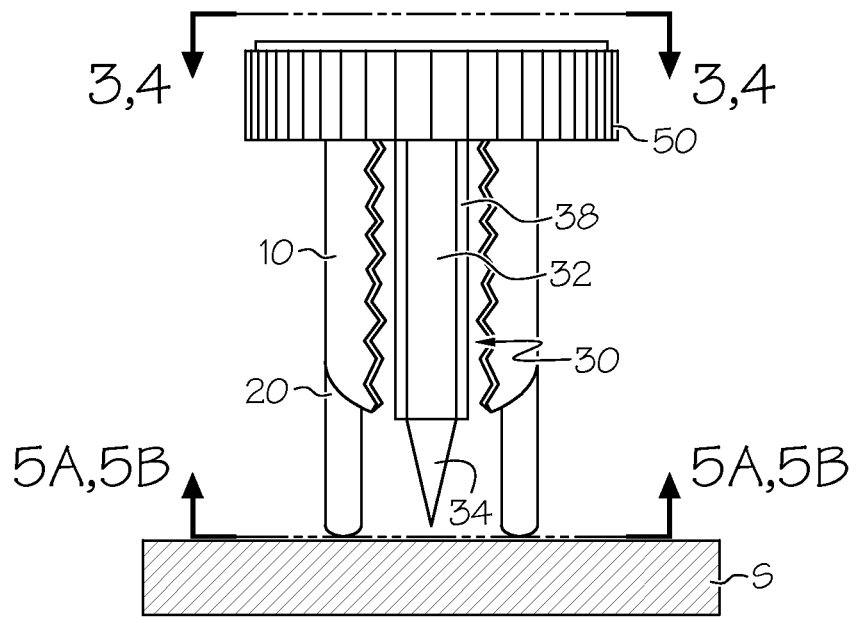
FIG. 1 is a cross-sectional schematic view of a depth gauge according to one or more embodiments of the present invention.

The embodiments set forth in the drawing are illustrative in nature and not intended to be limiting of the invention defined by the claims. Moreover, individual features of the drawings and invention will be more fully apparent and understood in view of the detailed description.

DETAILED DESCRIPTION

Embodiments of the present invention are directed to depth gauges operable to detect a dent having a depth of, for example, about 0.01 mm or greater. Although this depth gauge has limitless contemplated industrial applications, the depth gauge is especially adept at measuring the depth of small dents and/or irregularities (e.g., scratches) on the surface of stamped steel vehicle parts (e.g., doors, hoods, etc.) before and/or after the hemming process such as during automobile manufacturing. Upon measurement of the depth of the dents using the depth gauges described herein, the inspector may determine if painting will adequately cover and fill the dent. In one exemplary embodiment, the present inventor has recognized that dents less than 0.07 mm deep can be effectively covered by the paint process, whereas dents deeper than 0.07 mm deep cannot be effectively covered by the paint process.

Referring to the embodiment of FIG. 1, a depth gauge 5 may include a housing 10, and a support structure disposed at the bottom of the housing 10. As shown in FIG. 1, the housing 10 (partially cut away) may comprise a cylindrical sleeve; however, other suitable housing shapes and structures are contemplated. Referring again to FIG. 1, the support structure may comprise a plurality of legs 20 extending from a bottom surface of the housing 10 in order to balance the depth gauge 5 on even or uneven surfaces. Referring to an embodiment as shown in FIG. 5C, the housing 10 may comprise a sleeve 20C which extends from the bottom of the housing around the surface engaging member 30 (described later herein) to act as a balancing surface.

Figure 5A:
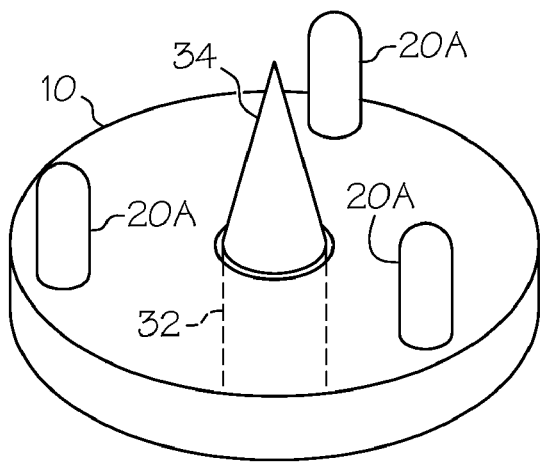
FIG. 5A is a bottom schematic view of a depth gauge comprising a plurality of legs according to one or more embodiments of the present invention.

In the embodiment of FIG. 5A, the plurality of legs 20A may be evenly spaced apart from one another on the outer circumference of the bottom surface of the cylindrical housing 10. In the alternative embodiment of FIG. 5B, the legs 20B may be arranged closer together (e.g., all on one hemisphere of the bottom surface of the cylindrical housing 10). The embodiment illustrated in FIG. 5B may be desirable when analyzing surfaces with minimal surface area, curved surfaces, or corner surfaces, such that two legs positioned in parallel and close to an edge are necessary for balancing the gauge 5.

Figure 5B:
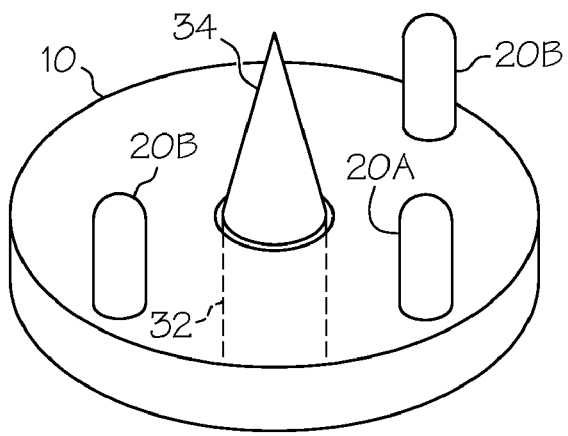
FIG. 5B is bottom schematic view of another depth gauge comprising a plurality of legs according to one or more embodiments of the present invention.

Although the embodiments of the FIGS. 5A and 5B show cylindrical housings 10 comprising three legs, it may be desirable to include more or less than three legs 20. Moreover, the legs 20 may include rounded lower ends which contact the surface to be analyzed. Including rounded ends ensures that all legs 20 are at least partially contacting the surface to be analyzed, especially when the depth gauge 5 is disposed on an uneven surface. The retractable legs 20 and the housing 10 generally comprise durable materials, for example, metals such as stainless steel. One of ordinary skill in the art would be familiar with other suitable durable materials. Similarly, the sleeve 20C embodiment of FIG. 5C may also include durable materials, such as stainless steel.

Figure 5C:
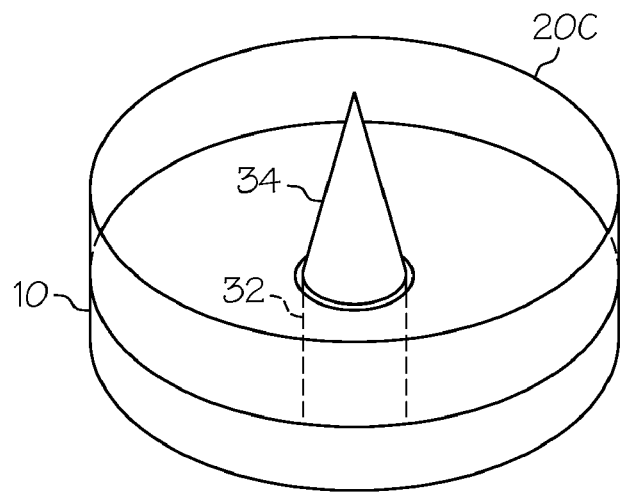
FIG. 5C is a bottom schematic view of yet another depth gauge comprising a sleeve for its support structure according to one or more embodiments of the present invention.

Referring again to the embodiments of FIGS. 5A-5C, the support structure (e.g., the plurality of legs 20A or 20B and the sleeve 20C) may be attached to the bottom of the housing 10 through any suitable mechanism known to one of ordinary skill in the art. For example, the support structure may be welded or threadingly coupled to the bottom of the housing 10. Additionally, the support structure extending from the bottom of the housing may actually be part of the housing, not separate components. In additional embodiments, it is contemplated that the plurality of legs 20A or 20B are rigid or retractable. In one embodiment, the retractable legs may be spring loaded. While both rigid and retractable legs provide stability for the depth gauge 5, the retractable legs may provide additional flexibility when the depth gauge 5 is placed on even or uneven surfaces.

Figure 2:
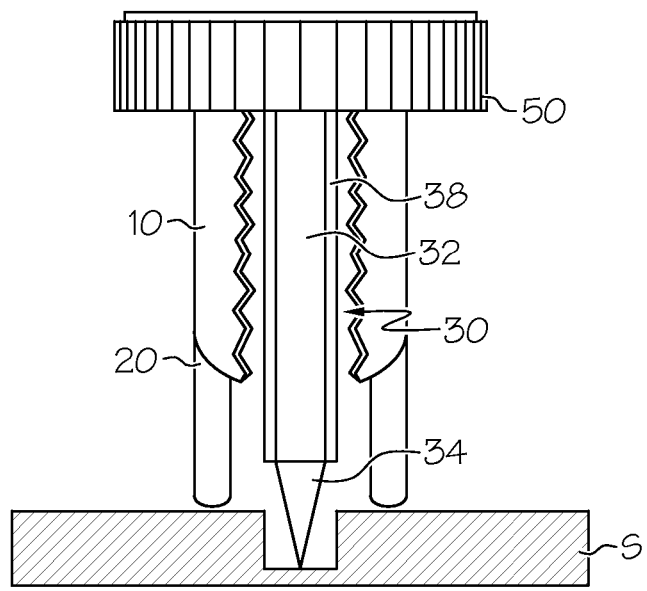
FIG. 2 is a cross-sectional schematic view of a depth gauge wherein the depth gauge is measuring a dent in a surface according to one or more embodiments of the present invention.

Referring again to FIG. 1, the depth gauge 5 may also include a retractable surface engaging member 30 extending through the bottom of the housing 10. As shown, the surface engaging member 30 may comprise a vertical shaft 32 and a lower point 34 extending through the housing 10. The lower point 34 is able to detect small dents on a surface S, for example, dents as small as 0.01 mm or even lower, while still having the flexibility to detect dents on a surface S having a depth of between about 0.01 to about 0.1 mm, or dents with even larger depths (e.g., approximately 1 mm). The retractable surface engaging member 30 may be a spring loaded or a plunger loaded shaft as would be familiar to one of ordinary skill in the art. Referring to FIG. 1, the retractable surface engaging member 30 may comprise a cylindrical shaped structure coaxially arranged within the cylindrical housing 10 and extending through the bottom of the housing 10. In addition to being disposed inside the housing 10, the surface engaging member 30 (e.g., a plunger as shown in FIGS. 1 and 2) may be supported inside a casing 38, in which the surface engaging member 30 may slide upwardly and downwardly therethrough. Similar to the housing 10, the retractable surface engaging member 30 may comprise durable materials, for example, metals such as stainless steel.

Referring to the embodiments of FIGS. 1 and 2, depth gauge 5 may also include a gauge display 40 coupled to the surface engaging member 30. As used herein, "coupled" may mean the gauge display 40 is directly attached to the surface engaging member 30 or may include intervening components between the gauge display 40 and the surface engaging member 30. For example, the surface engaging member 30 may be connected to a display actuator 36, which is connected to the gauge display 40. For the analog gauge display of FIG. 3, the surface engaging member 30 is configured to extend upwardly and downwardly. As shown, the surface engaging member 30 may extend downwardly into a dent as shown in FIG. 2, and may retracts upwardly when on a flat surface as shown in FIG. 2.

Figure 3:
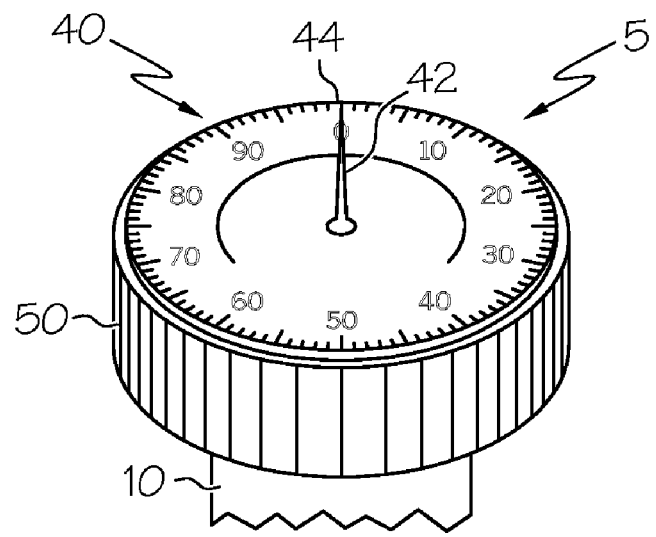
FIG. 3 is a partial top view of an analog depth gauge display according to one or more embodiments of the present invention.

Referring to the embodiment of FIG. 2, the movement of the surface engaging member 30 triggers the display actuator (now shown). For analog depth gauges as shown in FIG. 3, the display actuator may comprise a plurality of gears and gear shafts. In one embodiment, when the surface engaging member 30 moves due to entering a dent, a gear shaft coupled to the surface engaging member is moved therewith. The gear shaft then rotates a vertical gear, which directly or indirectly facilitates movement of the dial 42 as shown in FIG. 3, thereby providing a depth reading of the dent. Other suitable components for detecting the movement of the surface engaging member 30 and then providing a reading are contemplated herein, for example, the analog gauges commercially produced by the Mitotoyu Corporation.

Figure 4:
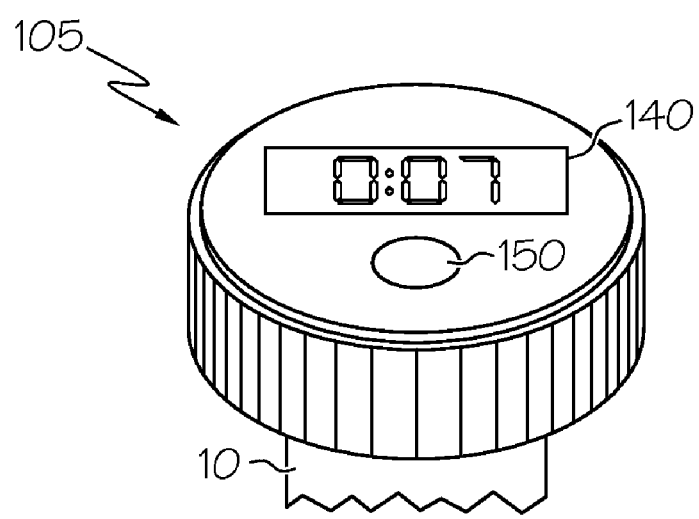
FIG. 4 is a partial top view of a digital depth gauge display according to one or more embodiments of the present invention.

As stated above, the gauge display 40 may be an analog display as shown in FIG. 3, or may be a digital display 140 as shown in FIG. 4. Other electronic displays such as an LCD display are also contemplated herein. In the analog display 40 of FIG. 3, the depth measurements 5 are displayed using the dial 42 and corresponding tick marks 44 of the display 40. Referring to FIG. 3, the depth gauge 5 may also include a calibration mechanism 50. The calibration mechanism 150 may comprise various suitable components, for example, a rotatable wheel 50 as shown in FIG. 3, or a button 150 as shown in FIG. 4. Switches or other components are also contemplated. When taking a depth measurement using the depth gauge 105 (or gauge 5), the user may place the depth gauge 105 on a flat surface 200 and then calibrate the gauge to zero by actuating the calibration mechanism 150.

The digital depth gauge 105 of FIG. 4 may comprise a similar housing 10 and support structure to the analog depth gauge 5; however, the surface engaging member 30 may include various components (e.g., a depth sensor, a processor, and/or a pressure transducer) to record the depth of a dent and output the measurement via the digital display 140. As the depth gauge 105 is calibrated on a flat surface, moving the depth gauge 105 into a surface portion with a dent may yield a depth reading on the gauge display 140. For example, as illustrated in FIG. 4, depth of dent measures 0.7 mm, which in one exemplary embodiment may constitute the largest possible dent which can be covered by painting as detailed below.

Figure 6:
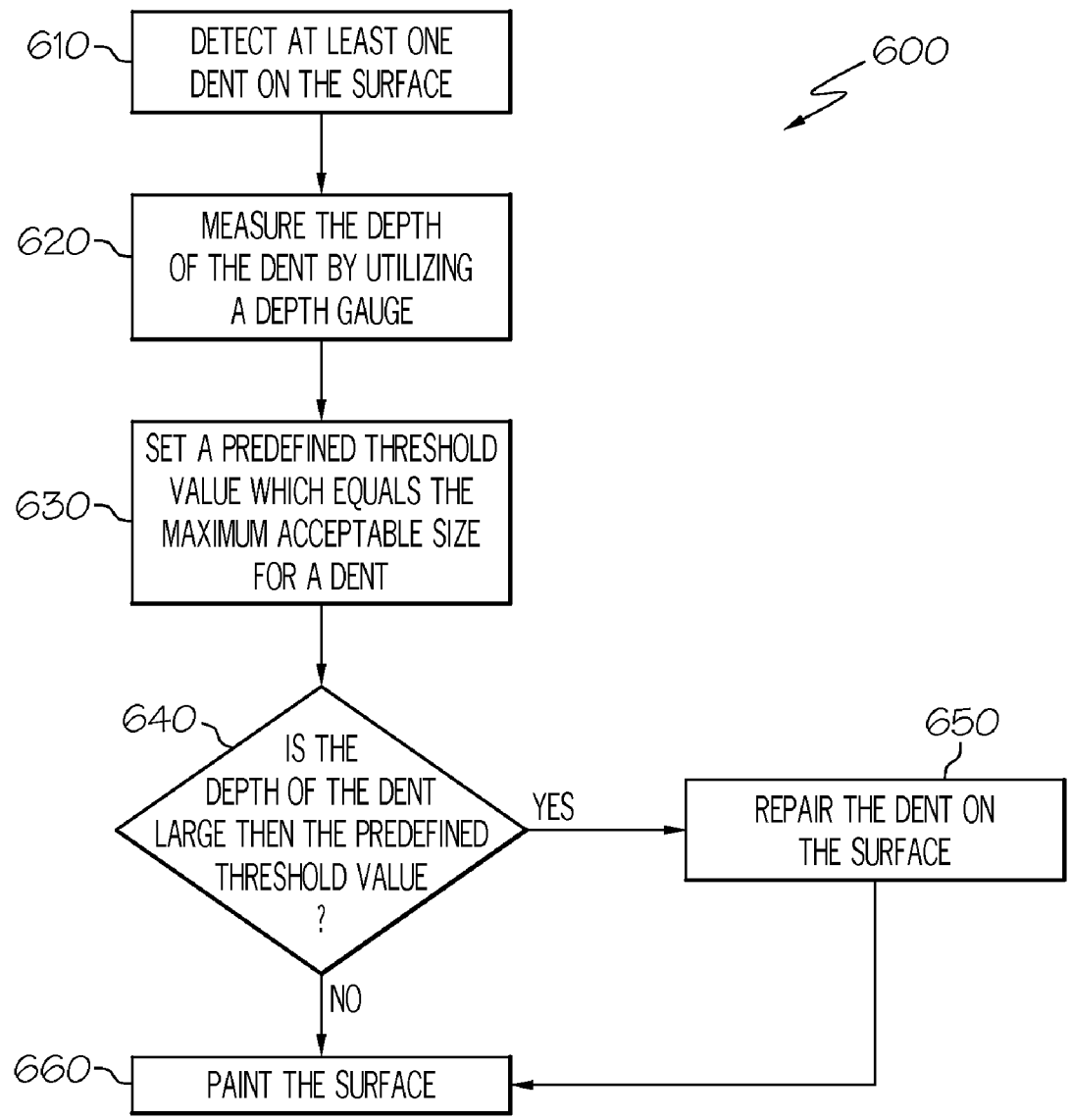
FIG. 6 is a flow chart illustrating a method of using the depth gauge to measure the depth of defects on a surface using a depth gauge according to one or more embodiments of the present invention.

Referring to the embodiment of FIG. 6, a process 600 for utilizing the depth gauges described herein to analyze and measure a surface for dents/defects is shown. In the detection step 610, a surface is analyzed for any visible dents. After the detection step 610, the depth of the dent is measured by utilizing a depth gauge 5 as shown in FIG. 2. After the measurement step 620, the measured depth is compared to a predefined threshold value. As shown in step 630 on FIG. 6, the predefined threshold value constitutes the maximum acceptable size for a dent. In one exemplary embodiment, the predefined threshold value is 0.07 mm. The comparison step 640 of FIG. 6 may be conducted manually or through a processor. The digital gauge of FIG. 4 may perform an automated comparison using its processor. If the depth of the dent is greater than the predefined threshold value, the surface must be repaired as shown in step 650. Upon repair 650, the surface may then be painted 660. If the dent is equal to or below the predefined threshold value, the surface may be directly painted 660 without a repair step 650.

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these aspects of the invention.

What is claimed is:

1. A depth gauge comprising:
   a housing;
   a support structure extending from the bottom of the housing and being configured to balance the depth gauge on uneven or even surfaces;
   a retractable surface engaging member extending through the bottom of the housing and comprising a lower point configured to detect dents on a surface; and
   a gauge display coupled to the surface engaging member and operable to output depth measurements of dents detected by the surface engaging member, the gauge display configured to output depth measurements of the dents in no greater than 0.01 mm increments to detect a dent having a depth of greater than a predetermined threshold where the predetermined threshold is less than 0.1 mm.

2. The depth gauge of claim 1 wherein the housing is a cylindrical housing.

3. The depth gauge of claim 1 wherein the surface engaging member extends the length of the housing.

4. The depth gauge of claim 1 wherein the gauge display is a digital display, an analog display, or combinations thereof.

5. The depth gauge of claim 1 further comprising a calibration mechanism coupled to the gauge display.

6. The depth gauge of claim 5 wherein the calibration mechanism comprises a rotatable wheel, a button, a switch, or combinations thereof.

7. The depth gauge of claim 1 wherein the support structure comprises a plurality of legs extending from the bottom of the housing.

8. The depth gauge of claim 7 wherein the plurality of legs are evenly spaced along the bottom of the housing.

9. The depth gauge of claim 7 wherein the plurality of legs are closely spaced along a section of the bottom of the housing.

10. The depth gauge of claim 7 wherein the plurality of legs are rigid or retractable.

11. The depth gauge of claim 7 wherein the plurality of legs are spring loaded.

12. The depth gauge of claim 1 wherein the support structure comprises a sleeve extending from the bottom of the housing.

13. The depth gauge of claim 1 wherein the retractable surface engaging member comprises a plunger or is spring loaded.

14. The depth gauge of claim 1 wherein the lower point of the surface engaging member comprises stainless steel.

15. The depth gauge of claim 1 wherein the lower point of the surface engaging member is configured to detect dents on a surface having a depth of about 0.01 mm and greater.

16. The depth gauge of claim 1 wherein the predetermined threshold is about 0.07 mm.

17. A depth gauge comprising:
    a cylindrical housing;
    a plurality of legs radially disposed on the bottom of the housing, wherein the plurality of legs are configured to balance the depth gauge on even or uneven surfaces, wherein at least one of the plurality of legs is retractable to facilitate use of the depth gauge on uneven surfaces;
    a spring loaded retractable surface engaging member coaxially arranged within the cylindrical housing and extending through the bottom of the housing, wherein the spring loaded retractable surface engaging member comprises a lower point configured to detect dents on a surface having a depth of between about 0.01 to about 0.1 mm; and
    a gauge display coupled to the surface engaging member, wherein the gauge display is operable to output depth measurements of dents detected by the surface engaging member.

18. A method of analyzing surfaces comprising:
    detecting at least one dent on the surface;
    measuring the depth of the at least one dent by utilizing a depth gauge, wherein the depth gauge is operable to output depth measurements of the at least one dent in no greater than 0.01 mm increments to detect dents having a depth of about 0.01 mm and greater;
    comparing the measured depth to a predefined threshold value, the predefined threshold value being equal to a maximum acceptable size for a dent; and
    repairing the dent on the surface when the measured depth is greater than the predefined threshold value.

19. The method of claim 18 further comprising painting the surface after the repairing step when the dent is greater than a predefined threshold value of about 0.07 mm.

20. The method of claim 18 further comprising painting the surface after the comparing step when the dent is equal to or below a predefined threshold value of 0.07 mm.

* * * * *